May 11, 1943.  J. R. MADEIRA  2,318,872
EXTENSIBLE CONVEYER
Filed July 17, 1941  2 Sheets-Sheet 1
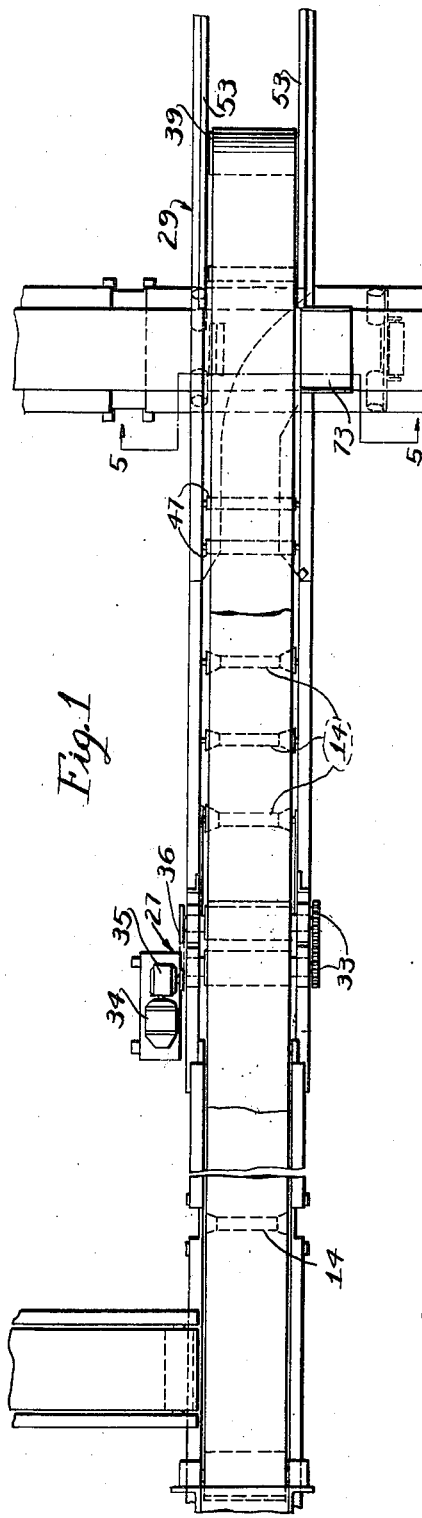
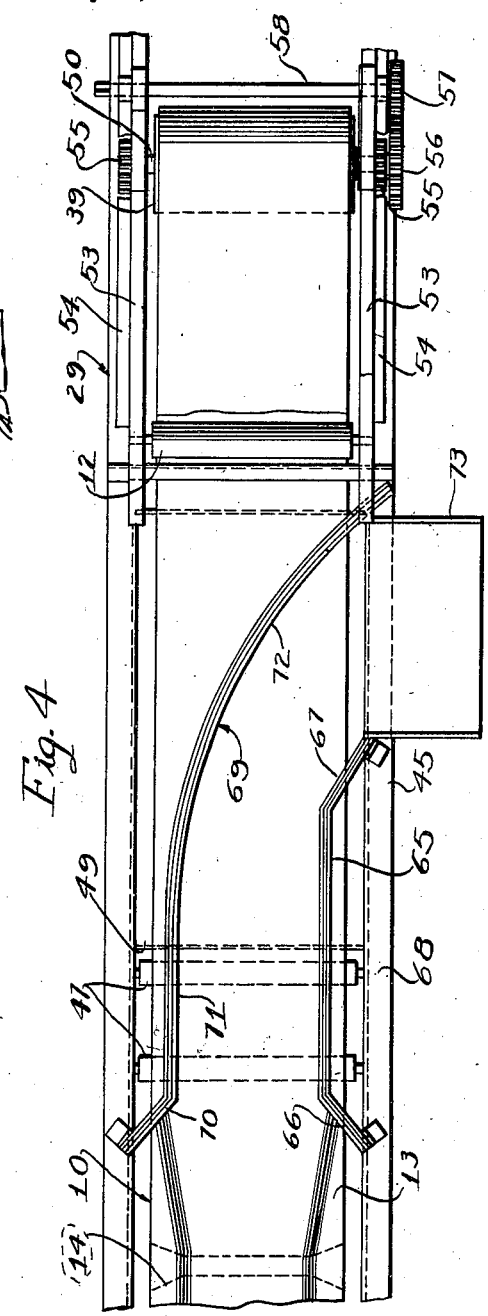
INVENTOR
John R. Madeira
Clarence F. Poole
ATTORNEY May 11, 1943.  J. R. MADEIRA  2,318,872
EXTENSIBLE CONVEYER
Filed July 17, 1941  2 Sheets-Sheet 2
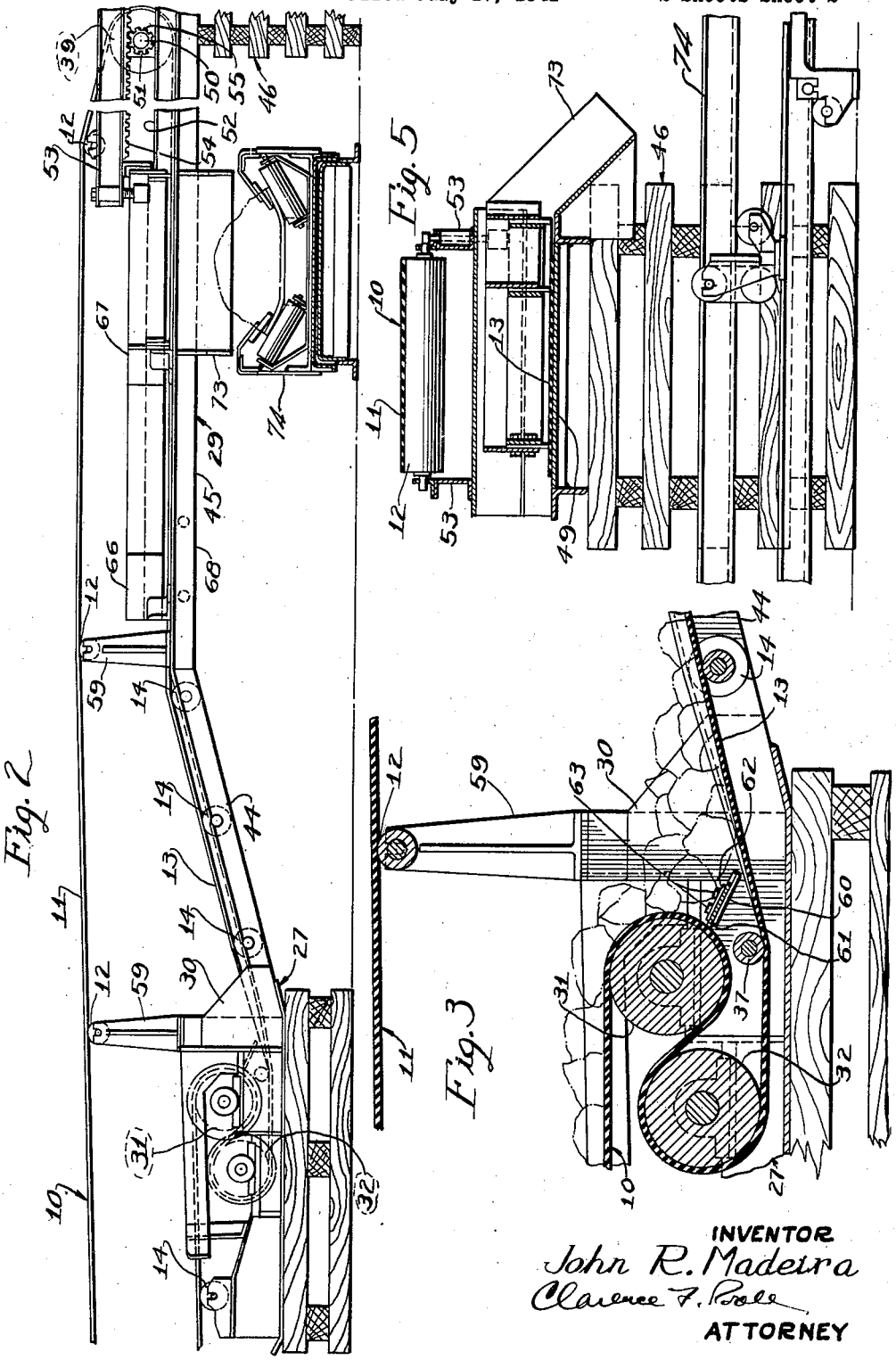
INVENTOR
John R. Madeira
Clarence F. Poole
ATTORNEY Patented May 11, 1943

2,318,872

UNITED STATES PATENT OFFICE 2,318,872

EXTENSIBLE CONVEYER

John R. Madeira, Chicago, Ill., assignor to Goodman Manufacturing Company, Chicago, Ill., a corporation of Illinois Application July 17, 1941, Serial No. 402,770

5 Claims. (Cl. 198—203)

This invention relates to improvements in extensible conveyers of the type particularly adapted for use in conveying material such as coal away from the working face in mines.

Extensible sectional conveyers have heretofore been commonly used in mines with quite a degree of success. One of the disadvantages of these conveyers, however, especially when operating in a mine room, is that due to the restricted height of the working place the return run of the belt must be closely adjacent the ground and frequently travels in dirt or water, causing damage to the belt and materially decreasing its life. Also the return run of the belt must be covered in order to prevent the dropping of material from the upper run of the belt onto the lower run thereof and to prevent the belt from carrying this material around the drive rollers of the conveyer, which also damages the belt and materially decreases its life.

The principal objects of my invention are to remedy these difficulties by providing a novel form of conveyer so arranged that covers for the return run of the belt may be dispensed with and having the return run of the belt spaced above the ground a distance sufficient to avoid running the belt in dirt or water.

A more specific object of my invention is to provide a conveyer so arranged that the lower or return run of the belt forms the material carrying portion thereof.

A further object of my invention is to provide an extensible sectional conveyer wherein material is carried on the lower or return run of the belt, and to provide a drive means for the lower run of the belt intermediate the ends of the conveyer, together with means arranged to permit the lower run of the belt to carry material over and beyond the drive means.

A still further object of my invention is to provide an improved means for discharging material from the lower run of the belt, to one side thereof.

Other objects of my invention will appear from time to time as the following specification proceeds and with reference to the accompanying drawings wherein:

Figure 1 is a fragmentary plan view of a belt conveyer constructed in accordance with my invention;

Figure 2 is an enlarged view in side elevation of a portion of the device shown in Figure 1, with certain parts broken away and certain other parts shown in section;

Figure 3 is an enlarged detail longitudinal sectional view, showing certain details of the drive for the belt;

Figure 4 is an enlarged fragmentary plan view showing the discharge end of the belt and the means for discharging material therefrom; and Figure 5 is a transverse sectional view taken substantially along line 5—5 of Figure 1, showing certain details of the conveyer at the discharge end thereof.

In the drawings the embodiment of my invention illustrated includes an endless conveyer belt 10 having an upper run 11 supported on a series of belt supporting rollers 12, 12, spaced above a lower run 13 of said belt a distance sufficient to permit material to be discharged onto said lower run of said belt. Said lower run of said belt is herein shown as being of a semi-trough-like formation supported on a series of longitudinally spaced rollers 14, 14 having frusto-conical ends to form the belt in the form of a shallow trough, although it may be a flat belt or may be supported in a trough-like formation.

A drive section 27, for the lower run of the belt, is provided intermediate the ends of the conveyer, while an upwardly spaced discharge section 29 is provided at the tail end of the conveyer. As herein shown, said drive section includes a frame 30 having a pair of power driven drive rollers 31 and 32 rotatably journaled thereon in a suitable manner. Said drive rollers are connected together by a pair of meshing spur gears 33, 33 and the drive roller 31 is shown as being driven from a motor 34 and speed reducer 35, connected to said last mentioned drive roller by means of a chain and sprocket drive generally indicated by reference character 36 (see Figure 1). Said motor and speed reducer are not herein shown or described in detail since they may be of any well known form and are no part of my present invention.

The drive roller 31 is spaced ahead of and slightly above the drive roller 32 so the lower run of the belt will wrap around both of said drive rollers for a greater portion of the circumferences thereof, to provide adequate driving surface for the belt. An idler roller 37 is mounted in the frame 30, beneath the drive roller 32, and engages the upper side of the lower run of the belt as it leaves the drive roller 32, to guide the belt to resume its travel to a tail roller 39, at the tail end of the conveyer.

The discharge section 29 of the conveyer includes an inclined frame section 44 having a plurality of the idler rollers 14, 14 mounted therein and a horizontal discharge frame section 45.

Said discharge frame section is herein shown as being relatively horizontal, supported at its rear end on an open framework built up from timbers and indicated by reference character 46. Said discharge frame section has a plurality of cylindrical idler rollers 47, 47 mounted in opposite sides thereof, and has a flat discharge plate 49 extending rearwardly from said rollers and forming a support for the belt as material is discharged therefrom. The tail roller 39 is mounted on a shaft 50, journaled in bearing blocks 51, 51, mounted for slidable movement along the horizontal frame portion 45. The amount of adjustable movement of said tail roller along said discharge frame section may vary, but should be at least sufficient to permit the extension of the conveyer for the length of one section, without requiring the insertion of additional sections of belt therein.

The bearing blocks 51, 51 are herein shown as being guided between channel members 52, 52 extending along opposite sides of the horizontal discharge section 45 and beyond the discharge end thereof, and channel members 53, 53, spaced upwardly from said first mentioned channel members and extending in parallel relation with respect thereto. Racks 54, 54 are secured to the lower outer sides of said last mentioned channels and depend therefrom and are meshed with pinions 55, 55, keyed on the shaft 59, adjacent opposite ends thereof. Said shaft and pinions are rotatably driven by means of a spur gear 56 keyed on one end of said shaft and meshed with a spur gear 57 keyed on a parallel shaft 58. A suitable hand crank (not shown) may be employed to rotatably move said shaft to adjustably move the tail roller 39, and a suitable ratchet mechanism (not shown) may be provided to hold said shaft from rotation and to hold the belt in tension. From said tail roller, the upper run of the belt passes over an idler roller 12 mounted on the channels 53, 53, and forwardly therefrom over similar idler rollers 12, 12, mounted on upright supporting frame members 59, 59 extending upwardly from said horizontal portion of said tail section and from said drive section.

Referring now to certain novel features of the drive section 27, the drive rollers 31 and 32 are so arranged that the lower run of the belt as it passes over the drive roller 31 is in cascade relationship with respect to the lower run of the belt as it passes from the drive roller 32. Material on the belt is thus discharged over the drive roller 31 onto the lower run of the belt as it passes from the drive roller 32.

A deflecting member 60 extends transversely across the frame 30, adjacent the lower portion of the drive roller 31 (see Figure 3). Said deflecting member is arranged at an obtuse angle with respect to the portion of the belt ahead of said rollers, and is adapted to receive the loose material as it is discharged over the drive roller 31 and deflect it onto the lower run of the belt as it leaves the drive roller 32, thus breaking the fall of the material and lessening the shock to the lower run of the belt. A wiping member 61 extends across said deflecting member and is secured thereto by means of a plate 62, extending along said deflecting member and clamping said wiping member in engagement with said deflecting member by means of bolts 63, 63. Said wiping member may thus have wiping engagement with the belt as it rounds the drive pulley 31 and may wipe loose material therefrom and clean the belt as it passes under said drive pulley and onto the drive pulley 32.

The means for discharging material to one side of the belt includes a side wall section 65 spaced above and inwardly of the outer margins of the belt and having ends 66 and 67 inclined outwardly from the main body portion of said side wall, which ends are secured to a side frame member 68 of the horizontal portion of the discharge section of the conveyer. A curved side wall section 69 is secured to an opposite side frame member 68 at its forward end and includes an outwardly inclined portion 70 secured to the side frame member 68 opposite from the side wall 65, which with the inclined end 66 of the side wall 65 serves to center material on the belt, a rectilinear portion 71 extending along the side of the belt opposite from the side wall section 65 to cooperate with the side wall 65 and hold material in the center of the belt, and a curved portion 72 curved to extend across the belt to provide a curved deflecting member, for deflecting material on the belt into a discharge chute 73 on the side of the conveyer adjacent the side wall 65. Said discharge chute is arranged to discharge material into a main line conveyer 74 which is shown as being a well known form of extensible conveyer. Since said main line conveyer extends along a main entry where there is more head room than in the working place, the lower run of the belt may be supported well above the ground, so said conveyer may be a standard form of troughed belt conveyer.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a belt conveyer, an endless belt, idler rollers for supporting the upper run of the belt above the lower run of the belt a distance sufficient to permit material to be deposited on and carried by the lower run of the belt, means intermediate the extreme ends of the conveyer having driving engagement with the lower run of the belt including a drive roller about which the lower run of the belt turns, another drive roller engaging the inside of the lower run of the belt and reversing the direction of travel thereof, to arrange the top side of the belt as it passes over and under said rollers in cascade relationship with respect to the top side of the belt as it passes by said last mentioned roller, so material will be discharged over said first mentioned roller onto the downwardly spaced receiving portion of said belt, and means disposed adjacent said first mentioned drive roller to prevent material from dropping directly onto said downwardly spaced receiving portion of said belt and to clean material from said belt before it reaches said second mentioned drive roller.

2. In a belt conveyer, an endless belt, idler rollers intermediate the ends of the conveyer, for supporting the upper run of the belt above the lower run of the belt a distance sufficient to permit material to be deposited on and carried by the lower run of the belt, means intermediate the extreme ends of the conveyer having driving engagement with the lower run of the belt including a drive roller, about which the lower run of the belt turns, another drive roller engaging the inside of the lower run of the belt and reversing its direction of travel, to arrange the top side of the lower run of the belt as it passes over and under said drive rollers in cascade relationship with respect to the top side of the belt as it passes by said last mentioned roller, so material will be discharged over said first mentioned roller onto the downwardly spaced receiving portion of said belt, and means disposed adjacent said first mentioned drive roller, to prevent material from dropping directly onto said downwardly spaced receiving portion of the belt and to prevent material from being carried by said belt to said second drive roller including a deflecting member extending transversely of said belt at an angle with respect to the downwardly spaced portion thereof, for receiving material discharged over said first mentioned drive roller and deflecting it onto said downwardly spaced portion of said belt.

3. In a belt conveyer, an endless belt, idler rollers intermediate the ends of the conveyer, for supporting the upper run of the belt above the lower run of the belt a distance sufficient to permit material to be deposited on and carried by the lower run of the belt, means intermediate the extreme ends of the conveyer having driving engagement with the lower run of the belt including a drive roller about which the lower run of the belt turns, another drive roller engaging the inside of the lower run of the belt and reversing its direction of travel, to arrange the top side of the belt as it passes over and under said drive rollers in cascade relationship with respect to the top side of the belt as it passes by said last mentioned roller, for discharging material over said first mentioned roller onto the downwardly spaced receiving portion of said belt, and means disposed adjacent said first mentioned drive roller, to prevent material from dropping directly onto said downwardly spaced receiving portion of the belt and to prevent material from being carried by said belt to said second drive roller including a deflecting member extending transversely of said belt at an angle with respect to the downwardly spaced portion thereof, for receiving material discharged over said first mentioned drive roller and deflecting it onto said downwardly spaced portion of said belt, and a wiping member having wiping engagement with the top side of said belt as it rounds said first mentioned drive roller.

4. In a belt conveyer, an endless conveyer belt supported so material may be deposited on and carried by the lower run of the belt, a pair of power driven drive rollers intermediate the ends of the conveyer and having the lower run of said belt reversely wrapped therearound, and spacing the top side of the lower run of the belt as it comes onto said rollers in cascade relation with the top side of the lower run of the belt as it leaves said rollers, so material will be discharged over said rollers onto a downwardly spaced receiving portion of said belt, means extending transversely of the belt adjacent the downwardly spaced receiving portion thereof, to prevent material from dropping directly onto said downwardly spaced receiving portion of said belt, and to deflect material onto said downwardly spaced receiving portion of said belt, for carrying material for discharge beyond said drive rollers.

5. In a belt conveyer, an endless conveyer belt supported so material may be deposited on and carried by the lower run of the belt, a pair of power driven drive rollers intermediate the ends of the conveyer and having the lower run of said belt reversely wrapped therearound, and spacing the top side of the lower run of the belt as it comes onto said rollers in cascade relation with the top side of the lower run of the belt as it leaves said rollers, so material will be discharged over said rollers onto a downwardly spaced receiving portion of said belt, means extending transversely of the belt adjacent the downwardly spaced receiving portion thereof, to prevent material from dropping directly onto said downwardly spaced receiving portion of said belt, and to deflect material onto said downwardly spaced receiving portion of said belt, for carrying material for discharge beyond said drive rollers, and an inclined frame extending beyond said drive rollers for elevating said lower run of said belt, for discharging material in an elevated plane with respect to said receiving portion thereof.

JOHN R. MADEIRA.